United States Patent
Dabhoiwala et al.

(10) Patent No.: US 11,880,657 B1
(45) Date of Patent: Jan. 23, 2024

(54) SYSTEMS AND METHODS FOR INFORMATION EXTRACTION ACCURACY ANALYSIS

(71) Applicant: Wells Fargo Bank, N.A., San Francisco, CA (US)

(72) Inventors: Aafrin Dabhoiwala, San Ramon, CA (US); Roberto Amparan, Tempe, AZ (US); Qianhui Rong, Charlotte, NC (US); Yang Angelina Yang, Mountain View, CA (US); Menglin Cao, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 156 days.

(21) Appl. No.: 17/444,929

(22) Filed: Aug. 12, 2021

(51) Int. Cl.
*G06V 30/12* (2022.01)
*G06V 30/413* (2022.01)
(Continued)

(52) U.S. Cl.
CPC ........ *G06F 40/295* (2020.01); *G06F 18/2113* (2023.01); *G06F 18/2163* (2023.01);
(Continued)

(58) Field of Classification Search
CPC ......... G06N 20/00; G06F 40/30; G06F 18/24; G06F 16/35; G06F 16/353; G06F 16/355;
(Continued)

(56) References Cited

U.S. PATENT DOCUMENTS

| 7,953,754 B2 * | 5/2011 | Cunnane | ............... G06F 40/258 707/786 |
| 10,956,477 B1 * | 3/2021 | Fang | ...................... G06F 40/30 |

(Continued)

OTHER PUBLICATIONS

Kummerfeld et al., Error-Driven Analysis of Challenges in Coreference Resolution, Oct. 2013 [retrieved Sep. 27, 2023], Proceedings of the 2013 Conference on Empirical Methods in Natural Language Processing, pp. 265-277. Retrieved: https://aclanthology.org/D13-1027.pdf (Year: 2013).*

(Continued)

*Primary Examiner* — Tom Y Lu
*Assistant Examiner* — Dennis Rosario
(74) *Attorney, Agent, or Firm* — K&L Gates LLP

(57) ABSTRACT

Systems, apparatuses, methods, and computer program products are disclosed for automatically determining accuracy of entity recognition of text. An example method includes segmenting a service entity recognition analysis of the text and a gold entity recognition analysis of the text into common superstrings that define entity spans. The example method further includes classifying each of the entity spans based on an accuracy of entity recognition in the service analysis of the text corresponding to the entity spans using a classification system that differentiates accurately identified but improperly bounded entities into at least three subcategories to obtain an entity accuracy classification. The example method also includes obtaining a score report based on the entity accuracy classification. The example method additionally includes performing an action set based on the entity accuracy classification.

20 Claims, 12 Drawing Sheets

(51) Int. Cl.
  *G06F 40/295* (2020.01)
  *G06F 18/241* (2023.01)
  *G06F 18/2113* (2023.01)
  *G06F 18/21* (2023.01)
  *G06F 18/2431* (2023.01)

(52) U.S. Cl.
  CPC ........ *G06F 18/241* (2023.01); *G06F 18/2431* (2023.01); *G06V 30/12* (2022.01); *G06V 30/413* (2022.01)

(58) Field of Classification Search
  CPC .............. G06F 40/284; G06F 18/241; G06F 18/24155; G06F 18/254; G06F 3/04883; G06F 2218/12; G06F 16/55; G06F 16/906; G06F 16/75; G06F 16/45; G06F 18/24765; G06F 18/243; G06F 18/00; G06V 10/764; G06V 10/82; G06V 2201/03; G06V 30/10; G06V 30/19173; G06V 30/413; G06V 30/26; G06V 30/262; G06V 30/268; G06V 30/274; G06V 40/172; G06V 30/153; G06V 20/41; G06V 30/19113; G06V 10/768; G06V 10/809; G06V 20/698; G06V 10/765; G06V 20/60; G06V 10/811; G06V 10/87; G06V 30/19107; G06V 30/2528; G06V 20/35; G06V 30/42; G06V 40/1365; G06V 30/12; G06V 30/148; G06V 30/36; G06V 30/226; G06V 30/2264; G06V 30/2272; G06V 30/2268; G06V 30/224; G06V 30/2247; G06V 30/2253; G06V 30/373; G06V 20/62; G06V 30/158; G06V 30/2445; G06V 30/245; G06V 30/2455; G06V 30/244; G06V 30/242; G06V 30/24; G06V 30/293; G06V 30/246; G10L 2015/0631; G10L 15/08; G10L 15/16; G10L 15/083; G10L 2015/086; G10L 13/08; G10L 17/14; G06T 2207/20081; G06T 2207/20084; G06T 7/0012; G06T 7/10; G06T 2207/30176; G06T 7/11; G06T 7/0002; G06T 2207/20021
  See application file for complete search history.

(56) References Cited

U.S. PATENT DOCUMENTS

| | | |
|---|---|---|
| 2009/0175545 A1 | 7/2009 | Cancedda et al. |
| 2015/0269139 A1* | 9/2015 | McAteer ................ G06F 40/30 704/9 |
| 2017/0177907 A1 | 6/2017 | Scaiano et al. |
| 2017/0278514 A1* | 9/2017 | Mathias ................ G06F 16/35 |

OTHER PUBLICATIONS

Kaushik Acharya, "Conditional Random Field (CFR) based Named Entity Recognition (NER) for Wet Lab Protocols", Proceedings of the 2020 EMNLP Workshop W-NUT: The Sixth Workshop on Noise User-generated Text, pp. 286-289, Nov. 19, 2020.

David S. Batista, "Named-Entity evaluation metrics based on entity-level", downloaded from www.davidsbatista.net/blog/2018/05/09/Named_Entity_Evaluation/, pp. 1-16, May 9, 2018.

Xu Liang, "Entity Level Evaluation for NER Task", Towards Data Science, downloaded from https://towardsdatascience.com/entity-level-evaluation-for-ner-task-c21fb3a8edf, pp. 1-7, Feb. 12, 2020.

* cited by examiner

| Tokens | Entity Classification | Start or Continuation |
|---|---|---|
| Check | | |
| for | | |
| BusyB | Organization | Start |
| ATM | | |
| near | | |
| grocery | | |
| store | | |
| on | | |
| Atlantic | Geographic Location | Start |
| avenue | Geographic Location | Continuation |

| Tokens | Gold Analysis | | Service Analysis | |
|---|---|---|---|---|
| | Entity Classification | Start or Continuation | Entity Classification | Start or Continuation |
| Check | | | | |
| for | | | | |
| BusyB | Organization | Start | Organization | Start |
| ATM | | | Organization | Continuation | } Partial
| near | | | | |
| grocery | | | Location | Start |
| store | | | Location | Continuation | } Spurious
| on | | | | |
| Atlantic | Geographic Location | Start | Geographic Location | Start |
| avenue | Geographic Location | Continuation | Geographic Location | Continuation | } Correct

FIG. 3C

| Tokens | Token # | Super Strings |
|---|---|---|
| Check | 1 | |
| for | 2 | |
| BusyB | 3 | B |
| ATM | 4 | X |
| near | 5 | |
| grocery | 6 | B |
| store | 7 | X |
| on | 8 | |
| Atlantic | 9 | B |
| avenue | 10 | X |

FIG. 8B

| Token | Gold | Predicted | Judgement | Superstring |
|---|---|---|---|---|
| check | O | O | Correct | O |
| wells | B-ORG | B-LOC | Incorrect | B |
| fargo | I-ORG | I-LOC | Incorrect | X |
| ATM | O | B-ORG | Spurious | B |
| near | O | O | Correct | O |
| costco | B-ORG | O | Missing | B |
| in | O | O | Correct | O |
| Forth | B-GPE | B-GPE | Correct | B |
| Worth | I-GPE | I-GPE | Correct | X |
| , | O | O | Correct | O |
| Texas | B-GPE | O | Missing | B |

FIG. 9A

| Partial-Missing | | | |
|---|---|---|---|
| Utterance | Gold | Predicted | Superstring |
| name | O | O | O |
| Phoenix | B-PER | O | B |
| frixby | I-PER | O | X |
| smith | I-PER | B-PER | X |

| Partial-Spurious | | | |
|---|---|---|---|
| Utterance | Gold | Predicted | Superstring |
| check | O | O | O |
| Fontana | B-ORG | B-ORG | B |
| Bank | I-ORG | I-ORG | X |
| loans | O | I-ORG | X |

| Partial-Imbalanced | | | |
|---|---|---|---|
| Utterance | Gold | Predicted | Superstring |
| search | O | O | O |
| NYC | B-LOC | B-LOC | B |
| USA | B-LOC | I-LOC | X |
| North America | B-LOC | I-LOC | X |

| Partial-Combined | | | |
|---|---|---|---|
| Utterance | Gold | Predicted | Superstring |
| name | O | B-PER | B |
| ally | B-PER | I-PER | X |
| phoenix | I-PER | B-ORG | X |
| frisby | I-PER | B-LOC | X |
| in | O | I-LOC | X |
| california | B-LOC | I-LOC | X |

FIG. 9B

SYSTEMS AND METHODS FOR INFORMATION EXTRACTION ACCURACY ANALYSIS

BACKGROUND

Interactions between parties using computing devices and/or computer implemented services may take many forms including, for example, the exchange of text (e.g., one or more characters that may be divided into words, phrases, sentences, paragraphs, etc.). Users of computing devices may type, dictate, or otherwise input text into their computing devices which, in turn, may be provided to other computing devices to facilitate communications between the parties and/or use of computer implemented services hosted by various computing devices or servers. To effectively utilize the provided text, the text may be analyzed to identify, for example, key pieces of information included in the text. The texts themselves may not directly identify the nature or presence of these key pieces of information. Instead, natural language processing or other types of information extraction techniques may be utilized to obtain, identify, or otherwise use these key pieces of information to drive subsequent processes (e.g., downstream services).

BRIEF SUMMARY

The quality of services provided using information extracted from text is limited by the accuracy of the extracted information. For example, inaccurately extracted information may cause downstream services to provide faulty or undesired services to upstream devices that provide text subject to downstream information extraction. Due to limited computing resources and existing programmatic limitations, the information extracted by various information extraction techniques may include a variety of errors.

Further, existing approaches to scoring the quality of information extracted through automated information extraction services are limited. Generally, the existing scoring approaches exhaustively search through service analyses of texts and gold analyses of texts to identify relevant scores. The exhaustive search approach may consume large quantities of computing resources and may not be reasonably scalable. For example, existing approaches to scoring may be subject to exponential computing resource consumption growth as the quantity of the scored information increases.

Additionally, the scoring systems implemented by existing scoring approaches provide only coarse error categorization. The coarse error categorization limits the utility of the existing scoring systems to drive refinement of information extraction techniques. For example, conventional scoring systems may broadly categorize a multitude of different types of errors into a single, broad category. By doing so, the automated information extraction services may also only be coarsely updated or modified due to the coarse error categorization, leading to automated information extraction services that are unable to accurately extract information from a broad variety of types of texts.

Systems, apparatuses, methods, and computer program products are disclosed herein for automatically determining accuracy of entity recognition of text (e.g., a form of information extraction). To determine the accuracy of entity recognition in text, both an entity recognition of the text by a service and a gold entity recognition of the text (e.g., by a person) may be divided into common spans that include at least one recognized entity (e.g., a classification specified by the analyses) in each common span. The portions of each of the entity analyses corresponding to each common span may be subjected to analysis to categorize each of the common spans into categories. Some of the categorizations may then be further sub-categorized into subcategories based on differences in boundaries of the entities specifies by the service analysis of the text and the gold analysis of the text (e.g., corresponding to a common span). These categorizations of the common spans may be used to score the accuracy of the entity recognition of the text.

By dividing the respective analyses into common spans, only a per-span level analysis may need to be conducted to classify each entity span. In contrast, conventional approaches may perform gross comparisons between nearly all portions of text analyses, thereby requiring substantially larger quantities of computing resources for processing completion. The per-span level scoring approach may result in mere linear scaling of computing resource consumption as the quantity of text analyses increases, whereas conventional approaches to scoring text analyses may scale exponentially in computing resources consumption as the quantity of text analyses increases.

Additionally, by providing for granular categorization of errors in entity recognition of text, downstream users of the scoring may also better tailor their services for entity recognition of text. For example, the granular categorization of errors may be used to drive the improvement of automated information extraction services. The granular categorization of errors may be used to select supplementary training data usable to more selectively improve machine learning models used to provide the automated information extraction services. Alternatively, the granular categorization of errors may be used to selectively route different texts to different automated information extraction services that are better able to provide information extraction services for the respective texts (e.g., by comparing features of the texts to the types of errors that each automated information extraction service is likely to make).

In one example embodiment, an apparatus is provided for automatically determining accuracy of entity recognition of text. The apparatus includes segmentation circuitry to segment a service entity recognition analysis of the text and a gold entity recognition analysis of the text into common superstrings that define entity spans. The apparatus also includes classification circuitry to classify each of the entity spans based on an accuracy of entity recognition in the service entity recognition analysis of the text corresponding to the entity spans using a classification system that differentiates accurately identified but improperly bounded entities into at least three subcategories to obtain an entity accuracy classification. The apparatus further includes scoring circuitry to: obtain, for a service that generated the service entity recognition analysis of the text, a score report based on the entity accuracy classification, and perform an action set based on the entity accuracy classification.

In another example embodiment, a method is provided for automatically determining accuracy of entity recognition of text. The method includes segmenting, by segmentation circuitry, a service entity recognition analysis of the text and a gold entity recognition analysis of the text into common superstrings that define entity spans. The method also includes classifying, by classification circuitry, each of the entity spans based on an accuracy of entity recognition in the service entity recognition analysis of the text corresponding to the entity spans using a classification system that differentiates accurately identified but improperly bounded entities into at least three subcategories to obtain an entity accuracy classification. The method further includes obtaining, by scoring circuitry and for a service that generated the service entity recognition analysis of the text, a score report based on the entity accuracy classification. The method additionally includes performing, by scoring circuitry, an action set based on the entity accuracy classification.

In a further example embodiment, a computer program product is provided for automatically determining accuracy of entity recognition of text, the computer program product includes at least one non-transitory computer-readable storage medium storing software instructions that, when executed, cause an apparatus to segment a service entity recognition analysis of the text and a gold entity recognition analysis of the text into common superstrings that define entity spans. The software instructions, when executed, also cause the apparatus to classify each of the entity spans based on an accuracy of entity recognition in the service entity recognition analysis of the text corresponding to the entity spans using a classification system that differentiates accurately identified but improperly bounded entities into at least three subcategories to obtain an entity accuracy classification. The software instructions, when executed, further cause the apparatus to obtain, for a service that generated the service entity recognition analysis of the text, a score report based on the entity accuracy classification. The software instructions, when executed, additionally cause the apparatus to perform an action set based on the entity accuracy classification.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3C illustrates an example comparison between two analyses of text in some example embodiments described herein.

FIG. 8B illustrates an example superstring identification for text analyses in some example embodiments described herein.

FIG. 9A illustrates a first example of patterns for pattern matching driven error identification in some example embodiments described herein.

FIG. 9B illustrates a second example of patterns for pattern matching driven error identification in some example embodiments described herein.

DETAILED DESCRIPTION

Figure 1:
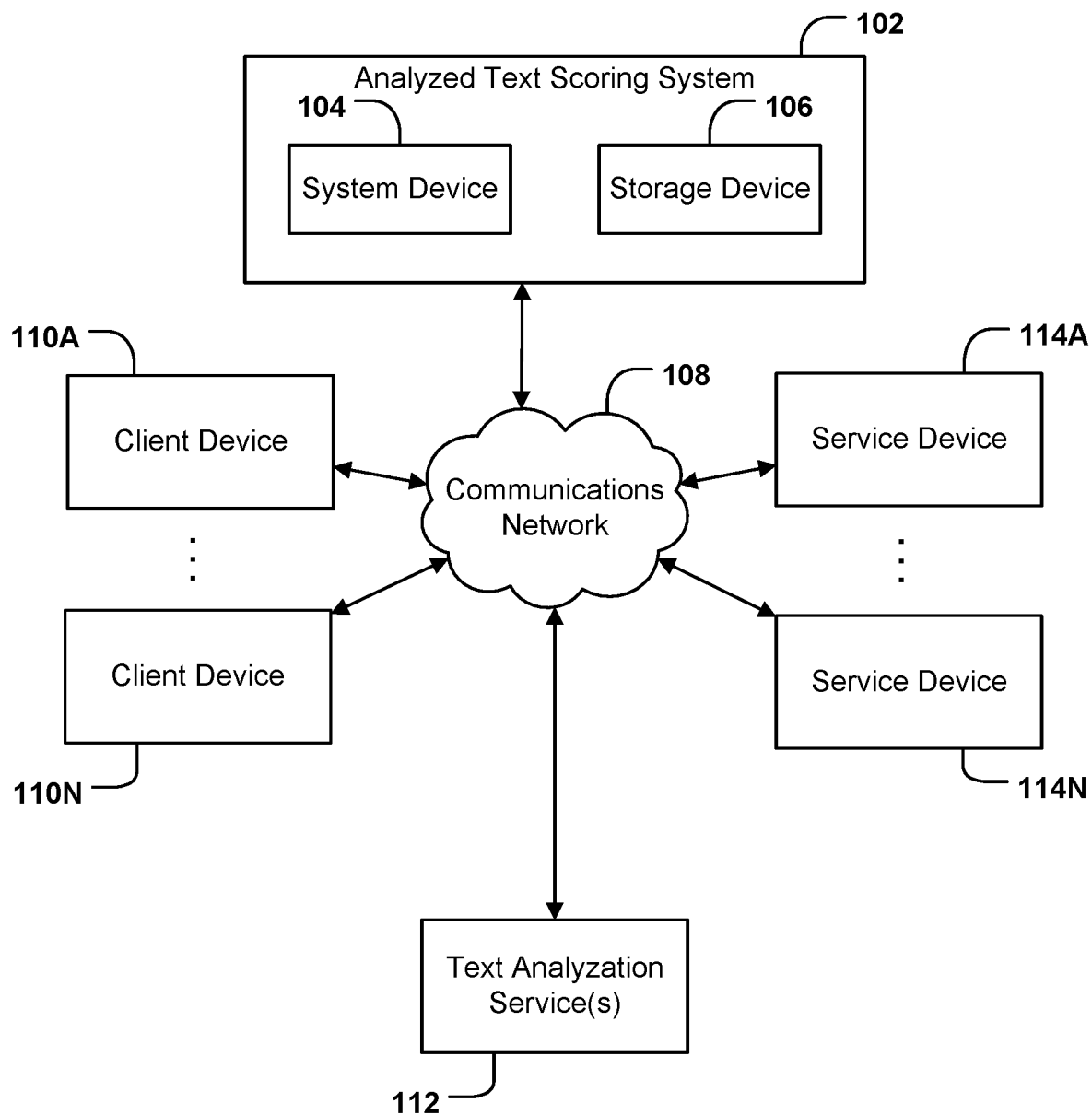
FIG. 1 illustrates a system in which some example embodiments may be used for measuring the accuracy of information extraction by automated services.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, example embodiments described herein provide methods, apparatuses, systems, and computer program products are described herein that provide for automated analysis of text. The text may be analyzed to obtain, for example, listings of entities specified in the text or other contextual information derived from the text.

Example embodiments may provide for the improvement of the automated analysis of text by determining an accuracy of the analysis of the text. The accuracy of the analysis of the text may be used, for example, to modify or otherwise change the manner in which subsequent text is analyzed. The accuracy of the analysis of the text may classify different types of errors in the analysis of the text. For example, the accuracy of the analysis of the text may classify different types of text analysis errors based on where differences in the boundaries in the analysis of the text lay.

In contrast to conventional techniques for determining the accuracy of analysis of text, example embodiments described herein provide for text analysis error classification that is usable to update the automated analysis of the text. For example, when the automated analysis of the text is implemented using machine learning (or other inference techniques), the text analysis error classification may be usable to identify supplementary training data usable to improve the accuracy of the automated analysis of the text. The supplementary training data may be used to retrain a machine learning model, thereby causing the machine learning model to more accurately analyze text.

Example embodiments may further provide for an improved rate (and/or decreased computing resource consumption cost) of determining the accuracy of analysis of text when only a limited quantity of computing resources are available. To ascertain the accuracy of the analysis of the text, the text analysis obtained through the automated analysis method may be compared to a gold text analysis (e.g., an analysis of the text by a person or other reliable source). The comparison may be obtained by performing a per-span comparison of the analysis of the text to the gold text analysis.

In contrast to conventional techniques for determining the accuracy of analysis of text, example embodiments described herein provide for computationally efficient determination of the accuracy of analysis of text by limiting the comparison range between the analysis of the text and the gold text analysis for each entity (or other type of information that may be extracted from the text). By doing so, the number of computations required for making the determination may be reduced when compared to methods that do not impose significant limits on the comparison ranges.

Although a high level explanation of the operations of example embodiments has been provided above, specific details regarding the configuration of such example embodiments are provided below.

System Architecture

Example embodiments described herein may be implemented using any number and type of computing devices. To this end, FIG. 1 illustrates an example environment within which various embodiments may operate. As illustrated, an analyzed text scoring system 102 may include a system device 104 in communication with a storage device 106. Although system device 104 and storage device 106 are described in singular form, some embodiments may utilize more than one system device 104 and/or more than one storage device 106. Additionally, some embodiments of the analyzed text scoring system 102 may not require a storage device 106 at all. Whatever the implementation, the analyzed text scoring system 102, and its constituent system device(s) 104 and/or storage device (s) 106 may receive and/or transmit information via communications network 108 (e.g., the Internet) with any number of other devices, such as one or more of client device 110A through client device 110N, text analyzation service(s) 112, and/or service device 114A through service device 114N.

System device 104 may be implemented using one or more servers, which may or may not be physically proximate to other components of analyzed text scoring system 102. Furthermore, some components of system device 104 may be physically proximate to the other components of analyzed text scoring system 102 while other components are not. System device 104 may receive, process, generate, and transmit data, signals, and electronic information to facilitate the operations of the analyzed text scoring system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the analyzed text scoring system 102. Storage device 106 may store information relied upon during operation of the analyzed text scoring system 102, such as text that has been analyzed with an automated service, text that has been analyzed by hand or through another reliable source, information regarding how to determine the accuracy of the text from the automated service, the accuracy off the analyses of text, and/or scores regarding the accuracy of the text analysis. In addition, storage device 106 may store control signals, device characteristics, and access credentials enabling interaction between the client devices 110A-110N), text analysis service(s) 112, and service devices 114A-114N.

The client devices 110A-110N may be implemented using any number (one, many, etc.) and type of computing devices known in the art, such as desktop or laptop computers, tablet devices, smartphones, or the like. The client devices 110A-110N may be associated with corresponding users (e.g., customers or other persons) that use the client devices 110A-110N to interact with one or more of the service devices 114A-114N. The clients may input text into the client devices 110A-110N when interacting with one or more of the service devices 114A-114N. The text may be provided to the service devices 114A-114N and/or the text analyzation service(s) 112 via communications network 108. The service devices 114A-114N may use the text and/or analyzation of the text by the text analyzation service(s) 112 to provide services to the client devices 110A-110N.

The service devices 114A-114N may be implemented using any number and types of computing devices known in the art, such as desktop or laptop computers, tablet devices, smartphones, or the like. The service devices 114A-114N may provide computer implemented services to the client devices 110A-110N and/or other devices. The computer implemented services may be provided, in part, using text from client devices 110A-110N and/or analysis of the text provided by text analyzation service(s) 112. The computer implemented services may include any number and types of computer implemented services without departing from embodiments disclosed herein.

For example, consider an example scenario in which a customer is using an application hosted by a portable phone (e.g., a client device) to communicate with a customer service representative using one of the service devices by typing phrases into the application. The client device may send copies of the typed phrases to the service device. To better enable the customer service representative to respond to the customer, the types phrases may be automatically analyzed by the text analyzation service(s) 112. The analysis of the phrases may be used by the service device to, for example, provide options to the customer service representative for responding to the customer. Consequently, the accuracy of the analysis of the text from the client device may impact the service provided by the service device to the customer. Improper analysis of the typed phrases may result in responses from the service device that are undesired by the customer.

The text analysis service(s) 112 may be implemented using any number and types of computing devices known in the art, such as desktop or laptop computers, tablet devices, smartphones, servers, or the like. The text analysis service(s) 112 may provide text analyzation services. The text analyzation services may include, for example, named entity recognition, personally identifiable information recognition, and/or other types of services that are able to provide information derived from text.

In one embodiment, the text analyzation services are implemented using inference methods such as, for example, machine learning. Machine learning may use a finite quantity of known relationships across a domain to make inferences regarding unknown relationships across the domain. To do so, a model may be trained using the known relationships. The trained model may be usable to make inferences regarding unknown relationships across the domain. The quality of the inferences provided by the trained model may depend upon the data used to train the model. For example, a lack of relationships over a portion of the domain may make inferences made using the trained model in the portion of the domain less accurate. In the context of text analysis, the trained model may take, as input, the text and may output information derived from the text such as, for example, a list of entities in the text (and/or other information such as portions of the text corresponding to the entities in the list), a list of personally identifiable information in the text (and/or other information such as portions of the text corresponding to the entities in the list), and/or other types of information that may be deduced from the text.

In one embodiment, the text analysis service(s) 112 use scores and/or other information provided by analyzed text scoring system 102 to update its operation. For example, text analysis service(s) 112 may retrain models based on the scores and/or other information to improve the accuracy of the analysis of text that it provides.

Although FIG. 1 illustrates an environment and implementation in which various functionalities are performed by different devices, in some embodiments some or all of the functionality of the client devices 110A-110N, text analyzation service(s) 112, and/or services devices 114A-114N is aggregated into a single device. For example, client devices 110A-110N may provide the functionality of text analyzation service(s) 112 or text analyzation service(s) 112 may provide the functionality of analyzed text scoring system 102 without departing from embodiments disclosed herein.

Example Implementing Apparatuses

Figure 2:
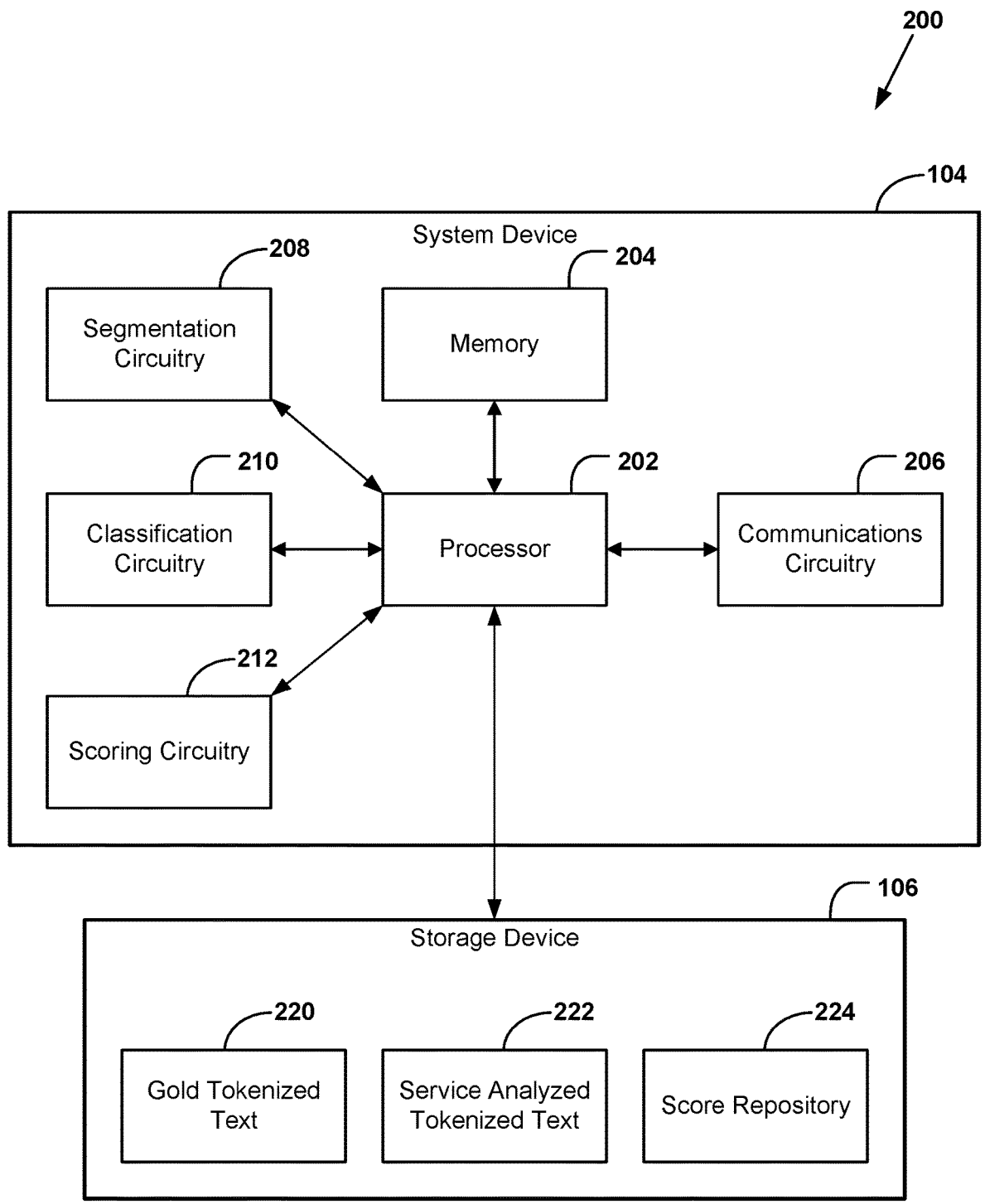
FIG. 2 illustrates a schematic block diagram of example circuitry embodying a device that may perform various operations in accordance with some example embodiments described herein.

System device 104 of the analyzed text scoring system 102 (described previously with reference to FIG. 1) may be embodied by one or more computing devices or servers, shown as apparatus 200 in FIG. 2. As illustrated in FIG. 2, the apparatus 200 may include storage device 106, processor 202, memory 204, communications circuitry 206, segmentation circuitry 208, classification circuitry 210, and scoring circuitry 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 4-6.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate or integrated storage device 106). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

In addition, the apparatus 200 further comprises segmentation circuitry 208 that segments analyzed text into superstrings and/or spans corresponding to entities included in text. The segmentation circuitry 208 may utilize processor 202, memory 204, or any other hardware component included in the apparatus 200 to perform these operations, as described in connection with FIGS. 4-6 below. For example, segmentation circuitry 208 may obtain copies of text analysis (e.g., 220, 222) stored in storage device 106 with processor 202 and store it in memory 204 for segmentation. The segmentation circuitry 208 may further utilize communications circuitry 206 to obtain analysis of texts from other sources (e.g., text analyzation service(s) 112, as shown in FIG. 1).

In addition, the apparatus 200 further comprises classification circuitry 210 that classifies errors included in analyzed text. The classification circuitry 210 may utilize processor 202, memory 204, or any other hardware component included in the apparatus 200 to perform these operations, as described in connection with FIGS. 4-6 below. For example, classification circuitry 210 may obtain information from score repository 224 to identify errors in analyzed text.

Further, the apparatus 200 further comprises scoring circuitry 212 that scores analyzed text based, in part, of classified errors. The scoring circuitry 212 may utilize processor 202, memory 204, or any other hardware component included in the apparatus 200 to perform these operations, as described in connection with FIGS. 4-6 below. For example, scoring circuitry 212 may obtain information from score repository 224 to identify score classified errors and store the resulting scores in score repository 224. The scoring circuitry 212 may also utilize communications circuitry 206 to provide the scores of analyzed text to other entities (e.g., text analyzation service(s) 112, as shown in FIG. 1).

Finally, the apparatus 106 may include storage device 106 that stores data structures used by segmentation circuitry 208, classification circuitry 210, and scoring circuitry 212 to provide their functionalities. Storage device 106 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

Figures 3A, 3B:
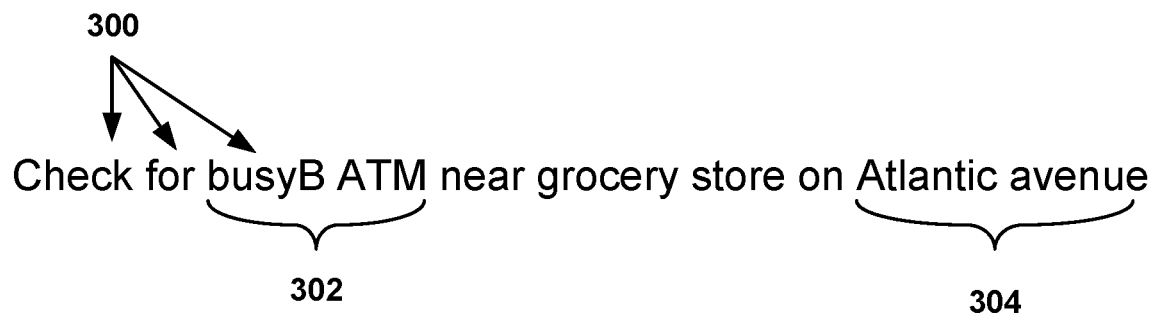
FIG. 3A illustrates an example analysis of text in some example embodiments described herein.
FIG. 3B illustrates an example gold analysis of text in some example embodiments described herein.

Storage circuitry may store gold tokenized text 220, service analyzed tokenized text 222, and/or score repository 224. Gold tokenized text 220 may be a hand analysis or other reliable analysis of some text. Refer to FIGS. 3A-3B for additional details regarding analysis of tokenized text. Serviced analyzed tokenized text 222 may be a service analyzed analysis of the text. Differences between service analyzed tokenized text 222 and gold tokenized text 220 may indicate errors present in the service analyzed tokenized text 222.

Score repository 224 may include (i) information usable to identify different types of errors in service analyzed tokenized text 222, (ii) information usable to score the service analyzed tokenized text 222, and/or (iii) scores regarding service analyzed tokenized text 222 and/or other analysis of text. The scores stored in score repository 224 may include one or more scores reflecting different metrics usable to compare the analysis of text provided by one of the text analyzation service(s) 112 to the other services.

Gold tokenized text 220, service analyzed tokenized text 222, and/or score repository 224 may be implemented using any number or type of data structures. For example, gold tokenized text 220, service analyzed tokenized text 222, and/or score repository 224 may be implemented using databases, lists, tables, linked lists, and/or other types of data structures.

Although components 202-212 are described in part using functional language, it will be understood that the particular implementations necessarily include the use of particular hardware. It should also be understood that certain of these components 202-212 may include similar or common hardware. For example, the segmentation circuitry 208, classification circuitry 210, and scoring circuitry 212 may each at times leverage use of the processor 202, memory 204, or communications circuitry 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although segmentation circuitry 208, classification circuitry 210, and scoring circuitry 212 may leverage processor 202, memory 204, or communications circuitry 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications circuitry 206 for enabling any functions not performed by special-purpose hardware elements. In all embodiments, however, it will be understood that the segmentation circuitry 208, classification circuitry 210, and scoring circuitry 212 are implemented via particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Text Analysis

As noted previously, a user of a client device may input text into an application hosted by the client device. The text may be provided to a text analyzation service (e.g., one of text analyzation service(s) 112) for information extraction.

Turning to FIG. 3A, an example text string is provided that illustrates information that may be desirable to extract from text. Specifically, FIG. 3A shows an example of named entities that may be recognized from the text by a text analyzation service (such as text analyzation service(s) 112, shown in FIG. 1).

To provide the named entity recognition, the text analyzation service may divide the text into tokens 300. A token may be an elemental unit processed by the text analyzation service. The text may be divided into tokens using any method without departing from embodiments disclosed herein. In one embodiment, the tokens correspond to words in the text. The words may be separated by spaces and/or punctuation. With reference to FIG. 3A, the example text includes 10 tokens.

The text analyzation service may perform information extraction on the tokens to obtain structured information. In one embodiment, the structured information is a list of entity classifications and/or information regarding the entity classifications included in the text. The entity classifications may classify each token as being a member of a classification or not being a member of a classification. For named entity recognition, the classifications may include, for example, names of persons, organizations, locations, and/or other types of entity classifications. As shown in FIG. 3A, "busyB ATM" is identified as a named entity 302, and "Atlantic avenue" is identified as another named entity 304. The named entities included in the text may span across multiple tokens 300. Thus, more than one token may be classified as being part of a classification.

Turning to FIG. 3B, an example of an analysis (i.e., performing information extraction on) of the text of FIG. 3A is provided. In FIG. 3B, the analysis is illustrated in tabular format, however, the text analyzation service may provide text analysis in different formats without departing from embodiments disclosed herein. In FIG. 3B and a number of additional figures (e.g., 3C, 8A, 8B, 9A, and 9B), tables are illustrated. In these tables, titles and headings are outlined with solid lines. The cells of the tables are outlined with dashed lines and arranged in rows and columns. The lowest order row (i.e., row 1) is toward the top of each table and directly below the headings outlined with solid lines. The lowest order column (i.e., column 1) is toward the left hand side of each page with sequentially higher number columns sequentially to its right. For example and with respect to FIG. 3B, the cell at row 1, column 1 recites "Check", the cell at row 2, column 1 recites "for", and the cell at row 3, column 3 recites "Start".

The analysis may include two types of information for each token: (i) an entity classification and (ii) whether the token is a start or a continuation of a classification (e.g., for entities that span multiple tokens) in the text. In this example, the first column is shown to show the words corresponding to each token. The second column specifies into which classification the token falls. The third column specifies whether the corresponding token is a start of a classification or a continuation of a classification.

For example, in the first row (corresponding to the token for "Check"), the second and third columns are empty which indicate that the token does not fall into any classifications. In contrast, the third row (corresponding to the token for "BusyB") is classified as being an organization (based on the presence of "Organization" in the second column, third row). The third column of the third row also indicates that the classification in the second row is a start of a classification. Similarly, rows 9 and 10 indicate that the "Atlantic" and "avenue" tokens are both classified as geographic locations while the "Atlantic" token is classified as the start of the classification with the "avenue" token being classified as a continuation of the classification.

These pieces of information may be of great significance to the user of the client device. If appropriately extracted, subsequent services that utilize this information may be more likely to provide desired services to the user. For example, consider a scenario where a user was trying to obtain help regarding a location of an automated teller machine. The name "BusyB" may be used to distinguish desired automated teller machines (i.e., those from BusyB) from other automated teller machines. Similarly, the geographic location may be usable to distinguish those close to the location of the user (i.e., Atlantic avenue) from those further away from the user. However, if the named entities are not recognized, then it may be more difficult to discriminate information that is relevant to from that which is irrelevant to the user.

In some embodiments, the analysis of text may be condensed for expediency. The analysis of the example text of FIG. 3A may be condensed into a list with elements corresponding to each of the tokens. The elements of the list may include both the classification information and the start/continuation information. For example, the text of FIG. 3A may be condensed as {O, O, Org-B, O, O, O, O, O, Loc-B, Loc-I} where the first two elements correspond to "check" and "for", the third element corresponds to "BusyB", and the last two elements correspond to "Atlantic" and "avenue", respectively. For tokens that are not classified, the corresponding entries in the list may be filled with the character "O". For tokens that are classified, the corresponding entries of the list may be filled with a string (e.g., "Org", "Loc") indicating the token classification, a string (e.g., B, I) indicating whether the corresponding token is a start or a continuation of a classification, and string (e.g., "-") delimiting the other strings.

Turning to FIG. 3C, text analysis performed by a service may be compared to text analysis that is known to be accurate (e.g., a gold entity recognition analysis) may be performed. Due to language complexity, text analysis performed by a service may include errors. These errors may take the form of incorrect classifications, missed classifications, classifications that are not properly bounded, and other types of classifications.

FIG. 3C shows an example comparison between an analysis of the text of FIG. 3A by an automated service and the gold entity recognition analysis for the text. The gold entity recognition analysis of the text is included in the second and third columns and the service analysis of the text is included in the fourth and fifth columns.

The service analysis of the text (third and fourth rows, fourth and fifth columns) correctly identifies that the third token (i.e., "BusyB", third row) includes an organization but incorrectly concludes that the fourth token (i.e., "ATM", fourth row) includes a continuation of the organization included in the third token. This difference reflects an incorrect boundary identification by the text analyzation service. An incorrect boundary identification occurs when the service analysis of the text properly classifies a token but indicates that the classification starts at least one token before the beginning of the classification and/or ends at least one token after the end of the classification. As will be discussed in greater detail below, embodiments of the invention may provide a system for classifying incorrect boundary identifications into different groups.

The service analysis also incorrectly identifies that both the sixth and seventh tokens (i.e., "grocery" and "store", rows 6-7) are classified as being locations. This difference reflects an incorrect identification that is spurious in nature. An incorrect identification is spurious when the service analysis indicates that tokens are to be classified in any classification even though the tokens do not actual belong to the classifications.

Additionally, the service analysis correctly identifies that the tenth and eleventh tokens (i.e., "Atlantic" and "avenue", rows 9-10) are classified as being geographic locations.

Based on the comparison above, the text analysis service that performed the analysis could be improved because it incorrectly identified at least two named entities in the text. However, from the above comparison, it may be unclear how the text analysis service should be modified to improve its operation. For example, if both of the errors are treated as being equivalent errors, then it may be challenging to determine how to improve the operation of the text analysis service.

Embodiments of the invention may provide for scoring of service analysis of text in a manner that is usable to ascertain the types of modifications that should be made to the text analysis service to reduce the likelihood of errors included in future analysis of text by the service. The service analysis of the text may be scored by granularly classifying different types of errors into different groups. By classifying different types of errors into different groups, the error groupings may be used to refine the text analysis service thereby improving the operation of the downstream services that use the text analysis provided by the text analysis service.

The error classification system used to score the service analysis of text may include granular groupings for classifications that are properly made but improperly bounded (e.g., partial errors), classifications that are made but are not present in the corresponding tokens (e.g., spurious errors), and classifications that are missed but are present in the corresponding tokens (e.g., missing errors).

Example Operations for Scoring Text Analysis

Figure 4:
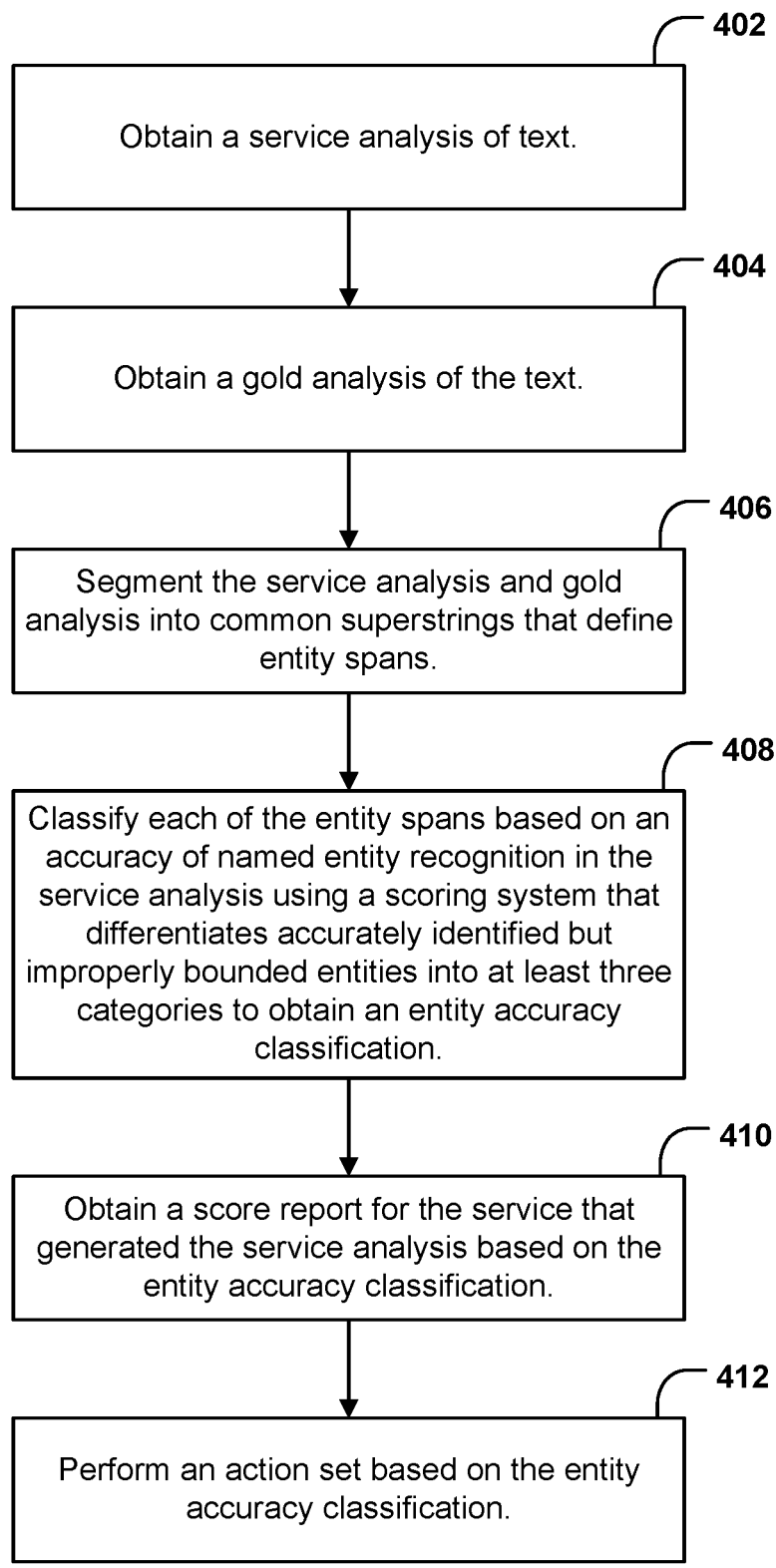
FIG. 4 illustrates an example flowchart for measuring the accuracy of text analysis, in accordance with some example embodiments described herein.
Figure 5:
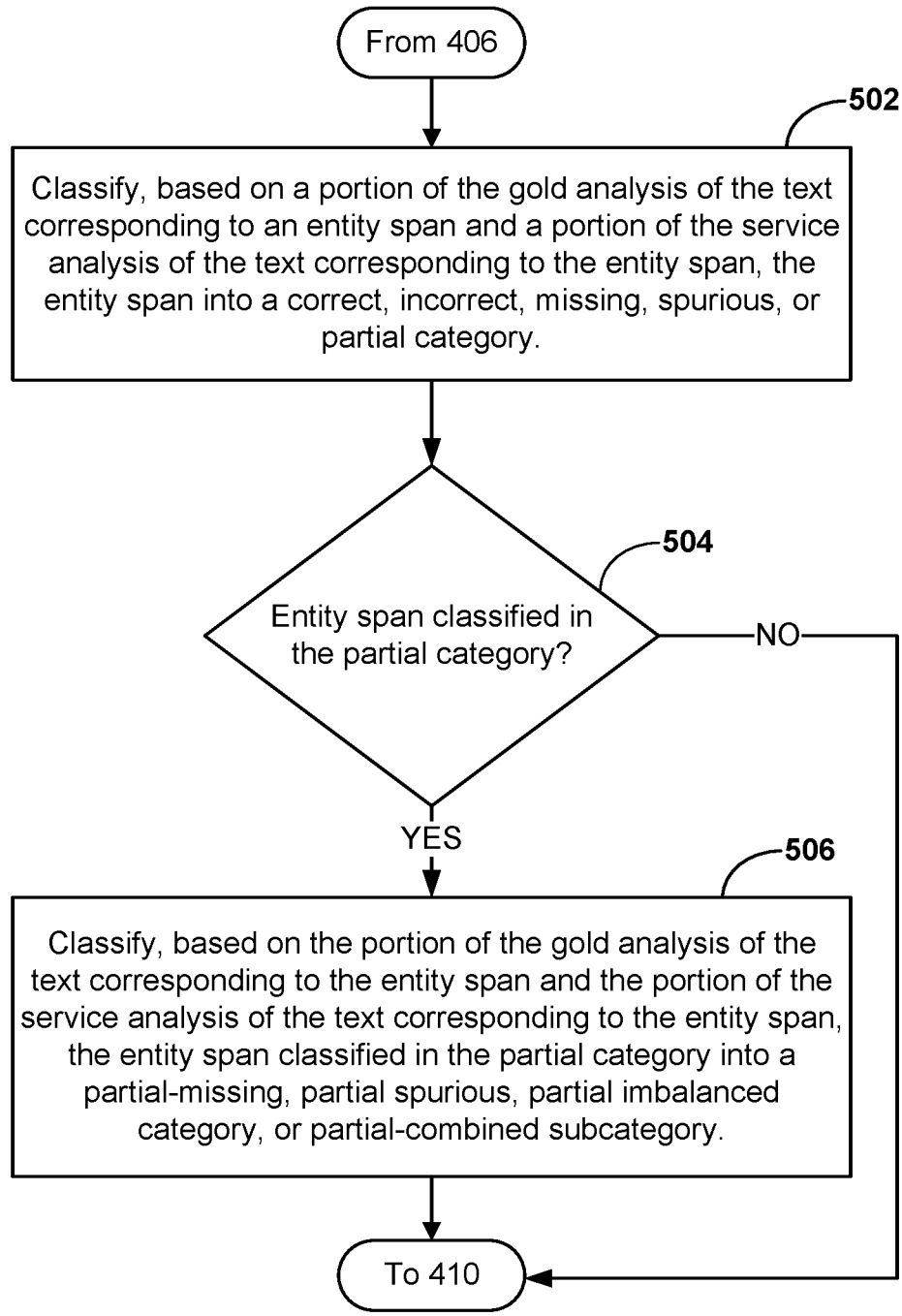
FIG. 5 illustrates an example flowchart for dividing multiple text analyses into common spans, in accordance with some example embodiments described herein.
Figure 6:
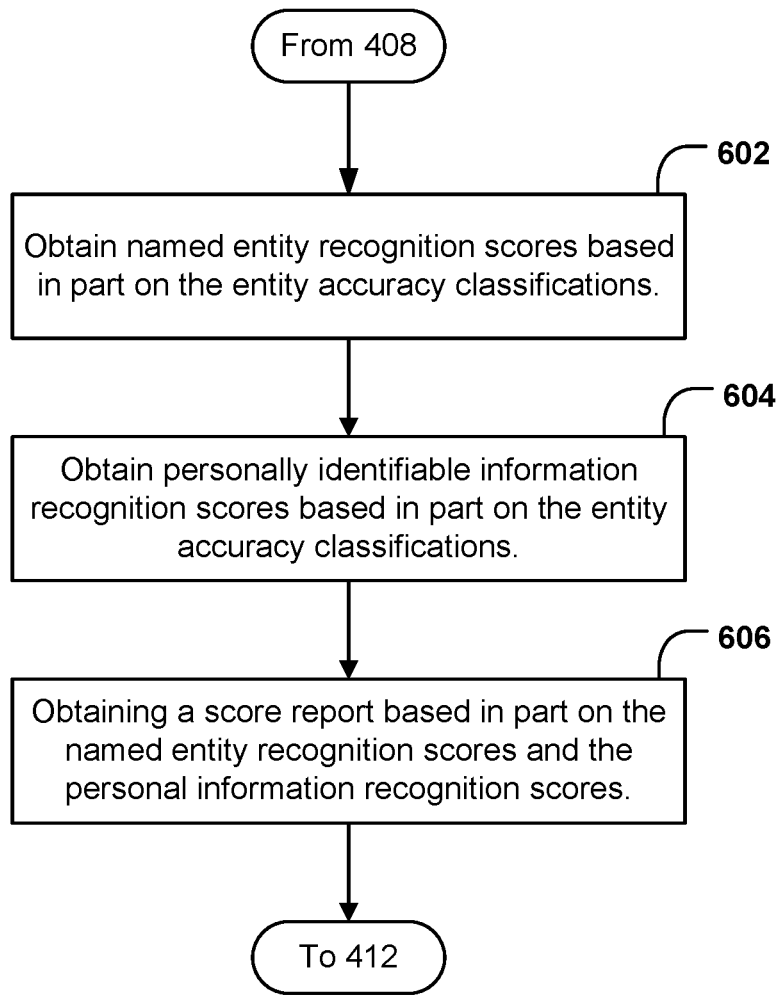
FIG. 6 illustrates another example flowchart for obtaining a score report for text analysis, in accordance with some example embodiments described herein.

Turning to FIGS. 4-6, example flowcharts are illustrated that contain example operations implemented by various embodiments described herein. FIGS. 4-6 illustrate example operations for scoring service analysis of text.

The operations illustrated in FIGS. 4-6 may, for example, be performed by system device 104 of the analyzed text scoring system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, segmentation circuitry 208, classification circuitry 210, scoring circuitry 212, storage device 106, and/or any combination thereof.

Turning first to FIG. 4, example operations are shown for determining the accuracy of analyzed text. For example, the text may be analyzed to identify entities in the text. The accuracy of the analysis of the text may be determined to improve the operation of the text analysis service the performed the analysis of the text.

As shown by operation 402, the apparatus 200 includes means, such as processor 202, memory 204, communications circuitry 206, segmentation circuitry 208, storage device 106, or the like, for obtaining a service analysis of text. The service analysis of the text may be obtained by reading a copy of the service analysis from storage device 106 with processor 202 or by obtaining a copy from a text analysis service with processor 202 and communications circuitry 206. The copy of the service analysis of the text may be stored in memory 204 with the processor 202.

As shown by operation 404, the apparatus 200 includes means, such as processor 202, memory 204, communications circuitry 206, segmentation circuitry 208, storage device 106, or the like, for obtaining a gold entity recognition analysis of the text. The gold entity recognition analysis of the text may be obtained by reading a copy of the gold entity recognition analysis from storage device 106 with processor 202 or by obtaining a copy of the gold entity recognition analysis from another device with processor 202 and communications circuitry 206. For example, a message requesting the copy of the gold entity recognition analysis may be sent to the other device with communications circuitry 206 and the copy of the gold entity recognition analysis may be received with the communications circuitry 206. The communications circuitry 206 may communicate with the other device using any communications scheme.

The copy of the gold entity recognition analysis of the text may be stored in memory 204 with the processor 202.

As shown by operation 406, the apparatus 200 includes means, such as processor 202, memory 204, communications circuitry 206, segmentation circuitry 208, storage device 106, or the like, for segmenting the service analysis and the gold entity recognition analysis into common superstrings that define entity spans.

Generally, as discussed above, the service analysis and gold entity recognition analysis may be stored as lists having elements corresponding to each token of the text. Each element corresponding to a token may indicate (i) whether the token is classified and (ii) whether the token is a start or a continuation of a classification. For example, consider the text "The Sunny food store in Sioux Falls." A gold entity recognition analysis of this text may be {O, Org-B, O, O, O, Loc-B, Loc-I} where "O" indicates that the token does not correspond to any classification, "B" indicates the start of the classification, "I" indicates a continuation of a classification, and the remaining indicates to which classification the token belongs.

The service analysis of the text may be segmented by (i) identifying boundaries in the service analysis of the text and the gold entity recognition analysis of the text based on a boundary map to identify boundary indices, (ii) obtaining start and stop indices of a tokenization of the text based on the boundary indices, and (iii) identifying the superstrings based on the start and stop indices. By identifying the superstrings, the computational complexity for determining the accuracy of the service analysis of the text may be greatly reduced. Rather than performing numerous comparisons between the service analysis of the text and various portions of the gold entity recognition analysis of the text, defined boundaries may be identified usable to perform a single comparison to identify a type of partial error that may be included in a superstring.

To identify the boundaries, the corresponding elements in the lists of the service analysis and gold entity recognition analysis of the text may be sequentially walked through and compared to the boundary map to identify the boundary indices. By sequentially walking through the corresponding elements, the service analysis and gold entity recognition analysis may only need to be walked once to identify all of the boundary indices. As the boundary indices are identified, they may be stored in memory 204. The boundary indices may be stored as a part of new data structure. The boundary indices corresponding to each superstring may be usable to identify corresponding portions of the service analysis and gold entity recognition analysis of the text. For example, the new data structure may be a list of the boundary indices (e.g., beginning and ending indices) corresponding to each superstring. Each of the entity spans correspond to a minimum portion of the first entity characterization and a minimum portion of the second entity characterization in which an entity identified by the first entity characterization may be located.

Figure 8A:
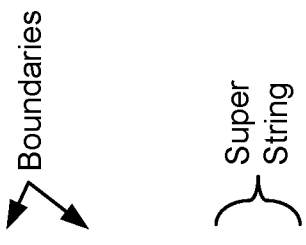
FIG. 8A illustrates an example comparison between gold and service analyses of text in some example embodiments described herein.

For example, consider an example gold entity recognition analysis and service analysis as illustrated in FIG. 8A. To identify the boundary indices in this example, the segmentation circuitry 208 may store copies of both analyses in memory 204. Once in memory, the segmentation circuitry may compare a null row (e.g., row zero) to the first row (corresponding to the token "check"). The null row may be treated as indicating that the corresponding token (in both analysis) does not belong to any classification. Because the first row also indicates that the corresponding token (in both analysis) does not belong to any classification, no boundary indices are identified. The segmentation circuitry may proceed to the second and third rows where it first identifies that at least one of the analysis indicates that the corresponding token (i.e., "BusyB") is classified. In response, the segmentation circuitry identifies the third row as being one of the boundary indices of a super string. The segmentation circuitry continues to process rows until it reaches the fifth row (corresponding to "near") where both analyses indicate that the corresponding token does not belong to any classification. In response, the segmentation circuitry identifies the fourth row as being one of the boundary indices of the super string (e.g., thereby identifying a superstring with boundary indices {3, 4}). The aforementioned process may continue until all of the boundary indices corresponding to each of the superstrings is identified.

For example, turning to FIG. 8B, the boundary indices may indicate the portions of the gold entity recognition analysis and the service analysis corresponding to each of the superstrings. In FIG. 8B, the superstrings are indicated in the third column with the character "B" indicating the start of a superstring and the character "X" indicating a continuation of a superstring. In this example, the text "Check for BusyB ATM near grocery store on Atlantic avenue" includes three superstrings with boundary indices of {{3, 4}, {6, 7}, {9, 10}}. These boundary indices may be stored in memory 204 for future use.

Returning to the discussion of FIG. 4, as shown by operation 408, the apparatus 200 includes means, such as processor 202, memory 204, communications circuitry 206, classification circuitry 210, storage device 106, or the like, for classifying each of the entity spans based on an accuracy of entity recognition in the service analysis of the text corresponding to the entity spans using a classification system that differentiates accurately identified but improperly bounded entities into at least three categories to obtain an entity accuracy classification.

To classify the entity spans, the classification circuitry may perform pattern matching. The results of the pattern matching may be used to classify the entity spans into different categories. The categories may include correct, incorrect, missing, spurious, and partial. If an entity spanned is classified as partial, it may be further classified into one of at least three categories based on the improper bounding of the entities in the entity spans. These at least three subcategories may, for instance, comprise a partial missing category, a partial spurious category, and a partial imbalanced category. The at least three subcategories may further include yet another subcategory, which is the partial combined category. Each of the at least three subcategories may be associated with corresponding patterns that specify arrangements of classifications in the entity span.

Each of the categories may be associated with a corresponding pattern. The portions of the service analysis and the gold entity recognition analysis corresponding to an entity span may be matched to one of the patterns to categorize the entity span into one of the categories.

The entity accuracy classification may be a data structure including (i) a listing of each of the categories into which each of the entity spans was classified and (ii) the number of tokens in the gold entity recognition analysis. The data structure may be stored memory 204. For additional details regarding pattern matching and classification of entity spans, refer to FIG. 5.

As shown by operation 410, the apparatus 200 includes means, such as processor 202, memory 204, communications circuitry 206, scoring circuitry 212, storage device 106, or the like, for obtaining, for a service that generated the service analysis of the text, a score report based on the entity accuracy classification.

The score report may be a data structuring including information indicating the performance of the text analysis service that generated the service analysis of the text. The score report may include separate scores for named entity recognition and/or personally identifiable information recognition. The entity named entity recognition score may include separate metrics for precision, recall, and F1. Similarly, the personally identifiable information score may include separate metrics for precision, recall, and F1.

In one or more embodiments disclosed herein, the precision and recall of each score are further bifurcated into multiple scores. For example, multiple definitions for both precision and recall may be used. In this manner, each score report may include four precision scores (e.g., calculated in two different ways for both the named entity recognition score and the personally identifiable information score), four recall scores (e.g., calculated in two different ways for both the named entity recognition score and the personally identifiable information score), and two F1 scores.

In one embodiment, the precision scores are calculated as follows: Precision=correct/(actual*(correct+incorrect+spurious)) and $$\text{Precision} = \left(\text{correct} + \frac{\text{Partial}}{2}\right) / (\text{actual} * (\text{correct} + \text{incorrect} + \text{partial} + \text{spuriouis})).$$

The precision score for each entity level recognition score may be calculated using only one of these definitions without departing from embodiments disclosed herein.

In one embodiment, the recall scores are calculated two different ways as follows: Recall=correct/(possible*(correct+incorrect+missing)) and $$\text{Recall} = \left(\text{correct} + \frac{\text{Partial}}{2}\right) / (\text{possible} * (\text{correct} + \text{incorrect} + \text{partial} + \text{missing})).$$

The recall score for each entity level recognition score may be calculated using only one of these definitions without departing from embodiments disclosed herein.

In one embodiment, the F-1 scores are calculated as 2*(precision*recall)/(precision+recall).

When calculating the precision and recall scores for the respective recognition scores, the partial errors may be counted differently. For example, for entity level named entity recognition scores, entity spans classified as partial-imbalanced may be counted as incorrect. In another example, for entity level personally identifiable information recognition scores, both partial-imbalanced and missing may be counted as incorrect.

The score report may be obtained by generating a data structure and populating it with the entity level named entity recognition scores and the entity level personally identifiable information recognition scores. The data structure may be stored in memory 204 and/or storage device 106 (e.g., as part of the score repository 224).

As shown by operation 412, the apparatus 200 includes means, such as processor 202, memory 204, communications circuitry 206, scoring circuitry 212, storage device 106, or the like, for performing an action set based on the entity accuracy classification.

The action set may include any number and quantity of actions to be performed. Any of the actions may be based on the precision, recall, and/or F1 scores included in the score report.

In one embodiment, the action set includes sending a copy of the score report to another entity. For example, the copy of the score report may be retrieved from memory 204 or storage 106, and transmitted to the other entity with communications circuitry 206.

In one embodiment, the action set includes updating the operation of a text analysis service. For example, supplementary training data may be selected based on the numbers and types of errors (e.g., the error groupings) identified in operation 408. The supplementary training data may be selected in quantities proportional to the types of errors. In this manner, supplementary training data may be proportionally selected to match the distribution of the types of errors. The supplementary training data may be used to update the operation of the text analysis service that generated the analysis of the text. For example, a machine learning model or other entity that performs the text analysis may be trained (e.g., retrained, supplementary trained, etc.) with the supplementary training data. By training the machine learning model with the supplementary training data, the accuracy of the inferences provided by the machine learning model may be selectively improved to reduce future errors similar to those identified in operation 408.

In one embodiment, the action set includes adding the score report to a log. For example, over time the performance of a text analysis service may be monitored by adding score reports to a log. The logged score reports may be used to identify trends or other indicators regarding the performance of the text analysis service over time. The trends or other indicators may be used to determine when the text analysis service should be modified to improve its performance. Once the time occurs, messages or other indicators may be sent to other entities (e.g., persons such as system administrators, automated system orchestrators, etc.) to initiate modification of the text analysis service.

In one embodiment, the action set includes selectively activating and/or deactivating text analysis services or otherwise route different texts to different text analysis services. Once the score report is obtained, it may be compared to other score reports from other text analysis services. The comparison may be used to select to which text analysis services to route texts for analysis. For example, some text analysis services may have higher named entity recognition scores while other text analysis service may have higher personally identifiable information recognition scores. The texts from the service devices may generally be being analyzed for these different purposes. The scores may be used to selectively route the text to the text analysis services that score better in these respective areas.

Turning to FIG. 5, example operations are shown for classifying the entity spans based on an accuracy of named entity recognition in the service analysis using a scoring system that differentiates accurately identified but improperly bounded entities into at least three categories to obtain an entity classification. These operations may be performed in place of and/or in addition to operations 408.

As shown by operation 502, the apparatus 200 includes means, such as processor 202, memory 204, communications circuitry 206, classification circuitry 210, storage device 106, or the like, for classifying an entity span into a category. The category may be chosen from a group of categories consisting of a correct category, an incorrect category, a missing category, a spurious category, or a partial category. The classification may be based on a portion of the gold entity recognition analysis of the text corresponding to the entity span and a portion of the service analysis corresponding to the entity span.

As discussed above, an entity span may be classified by performing pattern matching. To perform the pattern matching, the portion of the gold entity recognition analysis and the portion of the service analysis of the text (corresponding to the entity span) may be loaded into memory 204 (if not already loaded into memory 204). Once loaded, the portions may be matched to a pattern corresponding one of the correct, incorrect, missing, spurious, and partial category. Each pattern is discussed as follows.

The correct category may be associated with a pattern in which the portions of the service analysis and the gold entity recognition analysis of the text corresponding to the entity span exactly match (e.g., in both classification and bounds). In other words, the portions of both analyses specify that an entity in the entity spans is similarly classified, the similar classifications start at a same token in both analyses, and the similar classifications end at a same token in both analyses.

FIG. 9A shows an example illustrating a pattern corresponding to the correct category in rows 8 and 9. In these rows, both the gold entity recognition analysis (listed in the second column) and the service analysis (listed in column three) indicate that the tokens are both classified as geographic locations (i.e., similar classification) and that the classifications both start (indicated by the "B" in row 8, columns 2 and 3) at the first token in the entity span and continue (indicated by the "I" in row 9, columns 2 and 3) to the second token in the entity span.

The incorrect category may be associated with a pattern in which the portions of the service analysis and the gold entity recognition analysis of the text corresponding to the entity span both indicate the presence of a classification, but the service analysis indicates a different classification from the gold entity recognition analysis (e.g., different classifications but the same bounds).

With reference to FIG. 9A, rows 2 and 3 illustrate a pattern corresponding to the incorrect category. In these rows, both the gold entity recognition analysis (listed in column 2) and the service analysis (listed in column 3) indicate that the tokens are classified and have similar bounds (e.g., continue from the first token in the entity span to the second token), but the gold entity recognition analysis indicates that the tokens are classified as being organizations (indicated by the "ORG") while the service analysis indicates that the tokens are classified as being locations (indicated by the "LOC").

The missing category may be associated with a pattern in which the portion of the service analysis of the text corresponding to the entity span indicates that there are no classifications present in the entity span while the portion of the gold entity recognition analysis of the text corresponding to the entity span indicates the presence of a classification in the entity span.

With reference to FIG. 9A, row 6 illustrates a pattern corresponding to the missing category. In row 6, the gold entity recognition analysis (listed in column 2) indicates that the token is classified, but the service analysis (listed in column 3) indicates that the token is not classified (indicated by the "O").

The spurious category may be associated with a pattern in which the portion of the service analysis of the text corresponding to the entity span indicates that a classification is present in the entity span while the portion of the gold entity recognition analysis of the text corresponding to the entity span indicate that there are no classifications present in the entity span.

With reference to FIG. 9A, row 4 illustrates a pattern corresponding to the spurious category. In row 4, the gold entity recognition analysis (listed in column 2) indicates that the token is unclassified, but the service analysis (listed in column 3 indicates that the token is classified as an organization (indicated by the "ORG").

The partial category may be associated with a pattern in which the portions of the service analysis and the gold entity recognition analysis of the text corresponding to the entity span include a similar classification but have different bounds (e.g., identical classification and different bounds). In other words, the portions of both analyses specify that an entity in the entity spans is similarly classified, but that the similar classifications start and/or stop at different tokens in the entity span.

FIG. 9B shows four examples 900, 902, 904, 906 each illustrating tables with patterns corresponding to the partial category. In each of these examples 900, 902, 904, 906, tables are provided and include a title (e.g., "Partial-Missing"), Headings (e.g., "Utterance", "Gold", "Predicted", "Superstring"), and a number of cells arranged in rows and columns.

Specifically, FIG. 9B shows four entity spans (denoted in column 4) from four different texts (e.g., "name Phoenix frisby smith" in column 1, rows 1-4 of the partial-missing subcategory example 900; "check Fontana Bank loans" in column 1, rows 1-4 of the partial-spurious subcategory example 902; "search NYC USA North America" in column 1, rows 1-4 of the partial-imbalanced subcategory example 904; and "name ally phoenix frisby in california" in column 1, rows 1-6 of the partial-combined subcategory example 900). These four different texts include four subcategories of the partial category. However, to be classified in the partial category, the entity span only needs to meet one of these four patterns. The subcategories of the partial category will be discussed in greater detail below with respect to operations 506.

As seen in FIG. 9B, each of the partial subcategories examples include patterns in which both the portion of the gold entity recognition analysis of the text (in the second column) and the portion of the service analysis (in the third column) of the text corresponding to the entity span include a similar classification. For example, the partial-missing subcategory example 900 pattern indicates that the presence of a "PER" category in the entity span including "Phoenix frisby smith". Similarly, the partial-spurious subcategory example 902 pattern indicates the presence of a "ORG" category in the entity span including "Fontana Bank loans".

Additionally, the partial-imbalanced subcategory example 904 pattern indicates the presence of a "LOC" category in the entity span including "NYC USA North America". Lastly, the partial-combined subcategory example 906 pattern indicates the presence of a "PER" category in the entity span including "name ally phoenix frisby in california".

However, each of the partial subcategories example patterns also place different bounds on these categories. For example, the partial-missing subcategory example 900 pattern indicates that the gold entity recognition analysis of the text corresponding to the entity span indicates that the "PER" classification starts at the first token (i.e., corresponding to "Phoenix") and continues through the third token (i.e., corresponding to "smith") whereas the service analysis of the text corresponding to the entity span indicates that the "PER" classification starts and ends at the third token. Similarly, the partial-spurious example 902 pattern indicates that the gold entity recognition analysis of the text corresponding to the entity span indicates that the "ORG" classification starts at the first token (i.e., corresponding to "Fontana") and continues through the second token (i.e., corresponding to "Bank") whereas the service analysis of the text corresponding to the entity span indicates that the "ORG" classification starts at the first token but continues through the third token (i.e., corresponding to "loans").

Additionally, the partial-imbalanced example 904 pattern indicates that the gold entity recognition analysis of the text corresponding to the entity span indicates that the first three tokens (corresponding to "NYC", "USA", and "North America", respectively) are separately classified as different "LOC" instances whereas the service analysis of the text corresponding to the entity span indicates that a single instance of the "LOC" classification starts at the first token and continues through the third token (i.e., corresponding to "North America"). Lastly, the partial-combined example 906 pattern indicates that the gold entity recognition analysis of the text corresponding to the entity span indicates that the "PER" classification starts at the second token (i.e., corresponding to "ally") and continues to the fourth token (i.e., corresponding to "frisby") whereas the service analysis of the text corresponding to the entity span indicates that the "Per" classification starts at the first token (i.e., corresponding to "name") and continues through the second token (i.e., corresponding to "ally").

To perform pattern matching, processor 202 and/or classification circuitry 210 may perform a number of element comparisons to identify to which pattern (e.g., associated with a corresponding category) an entity span matches. For example, the portion of the gold entity recognition analysis of the text corresponding to the entity span may be analyzed to identify whether any classifications are present. If one or more classifications are present, the start and stop indices of each classification may be identified. The portion of the service analysis of the text corresponding to the entity span may be similarly analyzed (e.g., to identify classifications and start/stop indices of each classification). The classifications corresponding to the start/stop indices for the gold entity recognition analysis and the service analysis may be compared to determine to which pattern theses analyses match. The category corresponding to the matched pattern may be used as the classification for the entity span.

As shown by operation 504, the apparatus 200 includes means, such as processor 202, memory 204, communications circuitry 206, classification circuitry 210, storage device 106, or the like, for determining whether the entity span is classified in the partial category. The classification may be based on a portion of the gold entity recognition analysis of the text corresponding to the entity span and a portion of the service analysis corresponding to the entity span. As discussed above, the entity span may be classified in operation 502. The determination may be made based on the previously made classification. If it is determined that the entity span is classified in the partial category, then the flow may proceed to operations 506. Otherwise, the flow may proceed to operations 410, as described previously.

As shown by operation 506, the apparatus 200 includes means, such as processor 202, memory 204, communications circuitry 206, classification circuitry 210, storage device 106, or the like, for classifying, based on the portion of the gold entity recognition analysis of the text corresponding to the entity span and the portion of the service analysis of the text corresponding to the entity span, the entity span classified in the partial category into a partial-missing, partial spurious, partial imbalanced category, or partial-combined subcategory.

As discussed with respect to operations 502, each of the partial subcategories may be associated with corresponding patterns based on the portion of the gold entity recognition analysis of the text corresponding to the entity span classified in the partial category and the portions of the service analysis of the text corresponding to the entity span classified in the partial category. In one or more embodiments, the entity span classified in the partial category is classified by pattern matching to one of these subcategories.

To perform pattern matching, processor 202 and/or classification circuitry 210 may perform a number of element comparisons to identify to which pattern (e.g., associated with a corresponding subcategory) the entity span classified in the partial category matches. For example, the portion of the gold entity recognition analysis of the text corresponding to the entity span classified in the partial category may be analyzed to identify whether any classifications are present. If one or more classifications are present, the start and stop indices of each classification may be identified. The portion of the service analysis of the text corresponding to the entity span classified in the partial category may be similarly analyzed (e.g., to identify classifications and start/stop indices of each classification). The classifications corresponding to the start/stop indices for the gold entity recognition analysis and the service analysis may be compared to determine to which pattern theses analyses match. The subcategory corresponding to the matched pattern may be used as the classification (e.g., a sub-classification) for the entity span classified in the partial category.

Following operation 506, the flow may proceed to operation 410 to obtain a score report based on the entity accuracy classification.

Operations 502-506 may be repeated for any number of entity spans. The classifications for the entity spans may be aggregated, combined, or otherwise used to obtain the entity accuracy classifications, discussed with respect to operation 408.

Turning to FIG. 6, example operations are shown for obtaining a score report. These operations may be performed in place of and/or in addition to operation 410.

As shown by operation 602, the apparatus 200 includes means, such as processor 202, memory 204, communications circuitry 206, scoring circuitry 212, storage device 106, or the like, for obtaining named entity recognition scores based in part on the entity accuracy classifications. The named entity recognition scores may be obtained by calculating precision, recall, F1, and/or other metrics based on the entity accuracy classifications. When calculating these scores, entity spans classified as partial-imbalanced may be counted as incorrect (rather than as being the partial-imbalanced subcategory). In other words, the counts for these categories in the entity accuracy classifications may be adjusted to calculate these scores. In one or more embodiments, each of the precision scores and recall scores are calculated in at least two different manners, using the formals discussed above with respect to operation 410.

As shown by operation 604, the apparatus 200 includes means, such as processor 202, memory 204, communications circuitry 206, scoring circuitry 212, storage device 106, or the like, for obtaining personally identifiable information recognition scores based in part on the entity accuracy classifications. The personally identifiable information recognition scores may be obtained by calculating precision, recall, F1, and/or other metrics based on the entity accuracy classifications. When calculating these scores, entity spans classified as partial-imbalanced and missing may be counted as incorrect (rather than their respective categories). In other words, the counts for these categories in the entity accuracy classifications may be adjusted to calculate these scores. In one or more embodiments, each of the precision scores and recall scores are calculated in at least two different manners, using the formals discussed above with respect to operation 410.

As shown by operation 606, the apparatus 200 includes means, such as processor 202, memory 204, communications circuitry 206, scoring circuitry 212, storage device 106, or the like, for obtaining a score report based in part on the named entity recognition scores and the personally identifiable information recognition scores. The score report may be obtained by aggregating, combining, or otherwise using the named entity recognition scores and the personally identifiable information recognition scores to populate a data structure. The data structure may be initially stored in memory 204 and may be later stored in storage 106 and/or transmitted to other entities with communications circuitry 206. For example, a table data structure may be initialized in memory 204, and the rows and columns may be filled based on the respective recognition scores. Identifiers or other information usable to interpret the filled rows and columns may also be added (e.g., row names, column names, etc.).

In one embodiment, a copy of the score report is stored in score repository 224 to generate a log for the text analyzation service. The log may include score reports for the text analyzation service over time. Information regarding corresponding texts (e.g., that were the basis for the service analysis) may also be stored in the log. Consequently, relationships between various types of texts and score reports for the text analysis service may be established. These relationships be used, for example, to determine to which text analysis service various texts should be routed for processing for corresponding purposes. For example, various service devices (e.g., 114A, 114N, FIG. 1) may use analysis of text for different purposes. The logs may be used to improve the utility of the analyses provided to these service devices.

Following operation 606, the flow may proceed to operation 412 for performance of an action set, as described previously.

Figure 7:
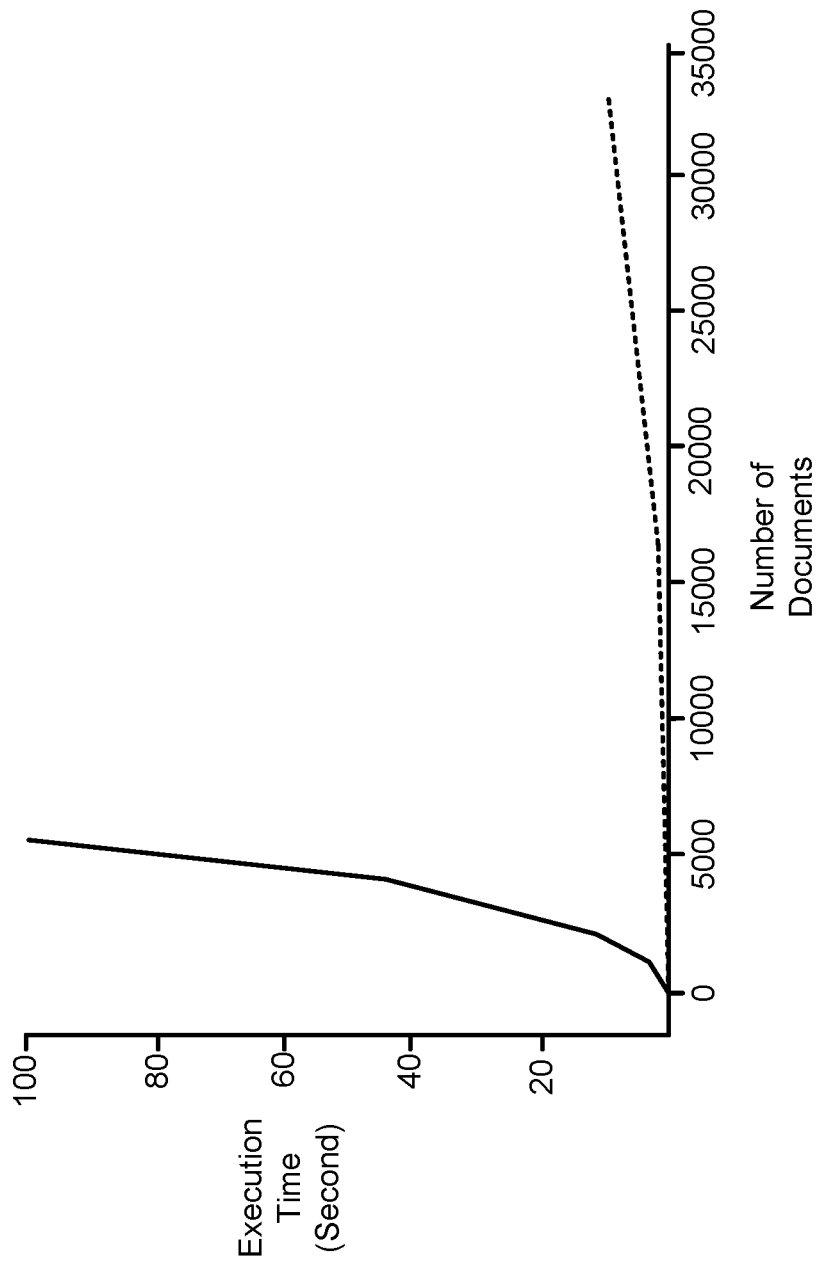
FIG. 7 illustrates a resource consumption comparison between conventional and innovative approaches measuring text analysis accuracy, in accordance with some example embodiments described herein.

As described above, example embodiments provide methods and apparatuses that enable improved scoring of analyses of text. For example, conventional approaches to scoring of text may be computationally expensive by performing numerous comparisons between various portions of text analyses to determine their accuracies. In contrast, embodiments disclosed herein may greatly reduce the computational expense for determining the accuracy of text analyses. Turning to FIG. 7, a plot illustrating the difference in computation performance between a leading conventional approach for text analyses accuracy determination (shown with a solid line) and the innovative approach for text analyses accuracy determination (shown with a dashed line) disclosed herein. To perform the comparison, identical computer hardware was used to perform the conventional and innovative approach with various numbers of documents (e.g., from 1 to 32,500). As seen in the plot, using the conventional approach, the time for scoring analyses of 5,000 documents exceeded 100 seconds while the time for scoring analyses of 5,000 documents using the innovative approach took less than 1 second. In FIG. 7, the vertical dimension of the plot is capped at 100 seconds readability purposes, but processing larger numbers of analyses of documents using the conventional approach took prohibitively long amounts of time whereas the innovative approach is capable of processes tens of thousands of analyses of documents in mere seconds. Thus, a system in accordance with one or more embodiments may address the problem of limited computing resources. By more efficiently utilizing limited computing resources, a system in accordance with embodiments may provide improved computer implemented services.

Additionally, as described above, example embodiments provide for error categorization at higher levels of granularity than conventional approaches. By providing a tractable range of subcategorizations of errors in text analyses, the categorizations may be better used to ascertain (i) which text analysis services are better suited for different types of analyses (e.g., thereby providing for improved text analyses accuracy) and (ii) how to update or otherwise modify text analysis services to improve their accuracies. By doing so, embodiments of the invention may address the problem of inaccuracy in computer implemented text analysis. Because text analysis drives many subsequent computer-implemented processes, improvements in computer implemented text analysis may also provide for improved downstream services that consume the automated text analyses provided by the text analysis services.

FIGS. 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automatically determining accuracy of entity recognition of text, the method comprising:

segmenting, by segmentation circuitry, a service entity recognition analysis result of the text and a gold entity recognition analysis result of the text into common superstrings that define entity spans;

classifying, by classification circuitry and using a classification system that differentiates accurately identified but improperly bounded entities into at least three subcategories to obtain an entity accuracy classification, each of the entity spans based on an accuracy of entity recognition in the service entity recognition analysis result of the text corresponding to the entity spans, wherein classifying an entity span of the entity spans further comprises:

identifying, by the classification circuitry, a difference between the service entity recognition analysis result and the gold entity recognition analysis result as an error of the service entity recognition analysis result, wherein the difference includes one of the accurately identified but improperly bounded entities, classifying, by the classification circuitry, the error into one category of a group of categories, and using, by scoring circuitry, the error that is classified into the one category in obtaining a score report for a service that generated the service entity recognition analysis result of the text;

obtaining, by the scoring circuitry and for the service that generated the service entity recognition analysis result of the text, the score report based on the entity accuracy classification; and performing, by the scoring circuitry, an action set based on the entity accuracy classification.

2. The method of claim 1, wherein classifying the entity span of the entity spans comprises:

classifying, by the classification circuitry and based on a portion of the gold entity recognition analysis result of the text corresponding to the entity span and a portion of the service entity recognition analysis result of the text corresponding to the entity span, the entity span into the one category of the group of categories consisting of a correct category, an incorrect category, a missing category, a spurious category, and a partial category.

3. The method of claim 2, wherein classifying the entity span of the entity spans further comprises:

making, by the classification circuitry, a determination that the entity span is classified in the partial category; and based on the determination: further classifying, by the classification circuitry, the entity span into one of at least three subcategories.

4. The method of claim 3, wherein the at least three subcategories comprise a partial missing category, a partial spurious category, and a partial imbalanced category.

5. The method of claim 3, wherein the at least three subcategories are associated with corresponding patterns that specify arrangements of classifications in the entity span.

6. The method of claim 3, wherein classifying the entity span into the one of the at least three subcategories further comprises:

pattern matching, by the classification circuitry, a pattern defined by the portion of the gold entity recognition analysis result of the text corresponding to the entity span and the portion of the service entity recognition analysis result of the text corresponding to the entity span to one of the patterns; and using, by the classification circuitry, a subcategory of the at least three subcategories corresponding to the pattern matched to one of the patterns as the classification for the entity span.

7. The method of claim 6, wherein the pattern matching comprises:

identifying, by the classification circuitry, one or more classifications included in the portion of the gold entity recognition analysis result of the text corresponding to the entity span and the portion of the service entity recognition analysis result of the text corresponding to the entity span; and identifying, by the classification circuitry, start and stop indices for each of the identified one or more classifications.

8. The method of claim 1, wherein obtaining the score report comprises:

obtaining, by the scoring circuitry, named entity recognition scores based in part on the entity accuracy classification;

obtaining, by the scoring circuitry, personal information recognition scores based in part on the entity accuracy classification; and obtaining, by the scoring circuitry, the score report based on the named entity recognition scores and the personal information recognition scores.

9. The method of claim 1, wherein segmenting the service entity recognition analysis result of the text and the gold entity recognition analysis result of the text comprises:

identifying, by the segmentation circuitry, boundaries in the service entity recognition analysis result of the text and the gold entity recognition analysis result of the text based on a boundary map to identify boundary indices;

obtaining, by the segmentation circuitry, start and stop indices of a tokenization of the text based on the boundary indices; and identifying, by the segmentation circuitry, the common superstrings based on the start and stop indices.

10. An apparatus for automatically determining accuracy of entity recognition of text, the apparatus comprising:

segmentation circuitry configured to segment a service entity recognition analysis result of the text and a gold entity recognition analysis result of the text into common superstrings that define entity spans;

classification circuitry configured to classify each of the entity spans based on an accuracy of entity recognition in the service entity recognition analysis result of the text corresponding to the entity spans using a classification system that differentiates accurately identified but improperly bounded entities into at least three subcategories to obtain an entity accuracy classification, wherein classifying an entity span of the entity spans further comprises:

identifying, by the classification circuitry, a difference between the service entity recognition analysis result and the gold entity recognition analysis result as an error of the service entity recognition analysis result, wherein the difference includes one of the accurately identified but improperly bounded entities, classifying, by the classification circuitry, the error into one category of a group of categories, and using, by scoring circuitry, the error that is classified into the one category in obtaining a score report for a service that generated the service entity recognition analysis result of the text; and the scoring circuitry configured to:

obtain, for the service that generated the service entity recognition analysis result of the text, the score report based on the entity accuracy classification, and perform an action set based on the entity accuracy classification.

11. The apparatus of claim 10, wherein the classification circuitry is configured to classify the entity span of the entity spans by:

classifying, based on a portion of the gold entity recognition analysis result of the text corresponding to the entity span and a portion of the service entity recognition analysis result of the text corresponding to the entity span, the entity span into the one category of the group of categories consisting of a correct category, an incorrect category, a missing category, a spurious category, and a partial category.

12. The apparatus of claim 11, wherein the classification circuitry is further configured to classify the entity span of the entity spans by:

making a determination that the entity span is classified in the partial category; and based on the determination: further classifying the entity span into one of the at least three subcategories.

13. The apparatus of claim 10, wherein the scoring circuitry is configured to obtain the score report based on the entity accuracy classification by:

obtaining named entity recognition scores based in part on the entity accuracy classification;

obtaining personal information recognition scores based in part on the entity accuracy classification; and obtaining the score report based on the named entity recognition scores and the personal information recognition scores.

14. The apparatus of claim 10, wherein the segmentation circuitry is configured to segment the service entity recognition analysis result of the text and the gold entity recognition analysis result of the text by:

identifying boundaries in the service entity recognition analysis result of the text and the gold entity recognition analysis result of the text based on a boundary map to identify boundary indices;

obtaining start and stop indices of a tokenization of the text based on the boundary indices; and identifying the common superstrings based on the start and stop indices.

15. A computer program product for automatically determining accuracy of entity recognition of text, the computer program product comprising at least one non-transitory computer-readable storage medium storing software instructions that, when executed, cause an apparatus to:

segment a service entity recognition analysis result of the text and a gold entity recognition analysis result of the text into common superstrings that define entity spans;

classify each of the entity spans based on an accuracy of entity recognition in the service entity recognition analysis result of the text corresponding to the entity spans using a classification system that differentiates accurately identified but improperly bounded entities into at least three subcategories to obtain an entity accuracy classification, wherein classifying an entity span of the entity spans further comprises:

identifying a difference between the service entity recognition analysis result and the gold entity recognition analysis result as an error of the service entity recognition analysis result, wherein the difference includes one of the accurately identified but improperly bounded entities, classifying the error into one category of a group of categories, and using the error that is classified into the one category in obtaining a score report for a service that generated the service entity recognition analysis result of the text;

obtain, for the service that generated the service entity recognition analysis result of the text, the score report based on the entity accuracy classification; and perform an action set based on the entity accuracy classification.

16. The computer program product of claim 15, wherein classifying the entity span of the entity spans comprises:

classifying, based on a portion of the gold entity recognition analysis result of the text corresponding to the entity span and a portion of the service entity recognition analysis result of the text corresponding to the entity span, the entity span into the one category of the group of categories consisting of a correct category, an incorrect category, a missing category, a spurious category, and a partial category.

17. The computer program product of claim 16, wherein classifying the entity span of the entity spans further comprises:

making a determination that the entity span is classified in the partial category; and based on the determination: further classifying the entity span into one of the at least three subcategories.

18. The computer program product of claim 17, wherein the at least three subcategories comprise a partial missing category, a partial spurious category, and a partial imbalanced category.

19. The computer program product of claim 15, wherein obtaining the score report based on the entity accuracy classification comprises:

obtaining named entity recognition scores based in part on the entity accuracy classification;

obtaining personal information recognition scores based in part on the entity accuracy classification; and obtaining the score report based on the named entity recognition scores and the personal information recognition scores.

20. The computer program product of claim 15, wherein segmenting the service entity recognition analysis result of the text and the gold entity recognition analysis result of the text comprises:

identifying boundaries in the service entity recognition analysis result of the text and the gold entity recognition analysis result of the text based on a boundary map to identify boundary indices;

obtaining start and stop indices of a tokenization of the text based on the boundary indices; and identifying the common superstrings based on the start and stop indices.

* * * * *